June 5, 1934.  W. J. ANDRES  1,961,837
BRAKE
Filed March 5, 1932

INVENTOR.
WILLIAM J. ANDRES
BY *C. H. Fowler*
ATTORNEY

Patented June 5, 1934

1,961,837

UNITED STATES PATENT OFFICE 1,961,837

BRAKE

William J. Andres, South Bend, Ind., assignor to Bendix Aviation Corporation, South Bend, Ind., a corporation of Delaware Application March 5, 1932, Serial No. 597,073

18 Claims. (Cl. 188—78)

This invention relates to brakes and more particularly to internal expanding brakes.

Broadly, the invention comprehends a brake structure including a backing plate having a fixed anchor thereon, a floating operating member having a cam confined within the anchor and friction elements positioned for movement on the backing plate engaging the cam through suitable openings in the anchor, so that reaction against the operating means in both directions may be attained.

In a structure of this type practically the same leverage may be had in both directions of drum rotation. It will also be observed that there is substantially no friction due to the cam rolling on a fixed pivot and also that since the reaction force is applied between its supports, there is no movement tending to twist the structure.

An object of the invention is to provide a simple brake structure having interchangeable parts.

Another object of the invention is to provide a brake structure having reaction against the operating member in both directions of drum rotation.

Another object of the invention is to provide a brake structure in which the operating member has practically the same leverage in both directions of drum rotation.

Another object of the invention is to provide a brake structure in which the operating member has practically no friction which is inherent in brake structures in which the operating member is mounted upon a pivot.

Yet a further object of the invention is to provide a brake in which the reaction force is supported on both sides and thus has no movement tending to twist.

An important feature of the invention is an operating member including a flat stamping having an opening and a cam pressed into the opening.

Another important feature of the invention is the particular structure of the anchor including a housing having means for securing same to the backing plate, and openings in the housing for the reception of the operating member.

A further important feature of the invention is to be found in the structure of the friction elements, particularly the separable ends of these elements and the engagement of the separable ends with the operating member through suitable openings in the anchor.

Other objects and features of the invention will appear from the following description taken in connection with the drawing, which forms a part of this specification, and in which.

Figure 1:
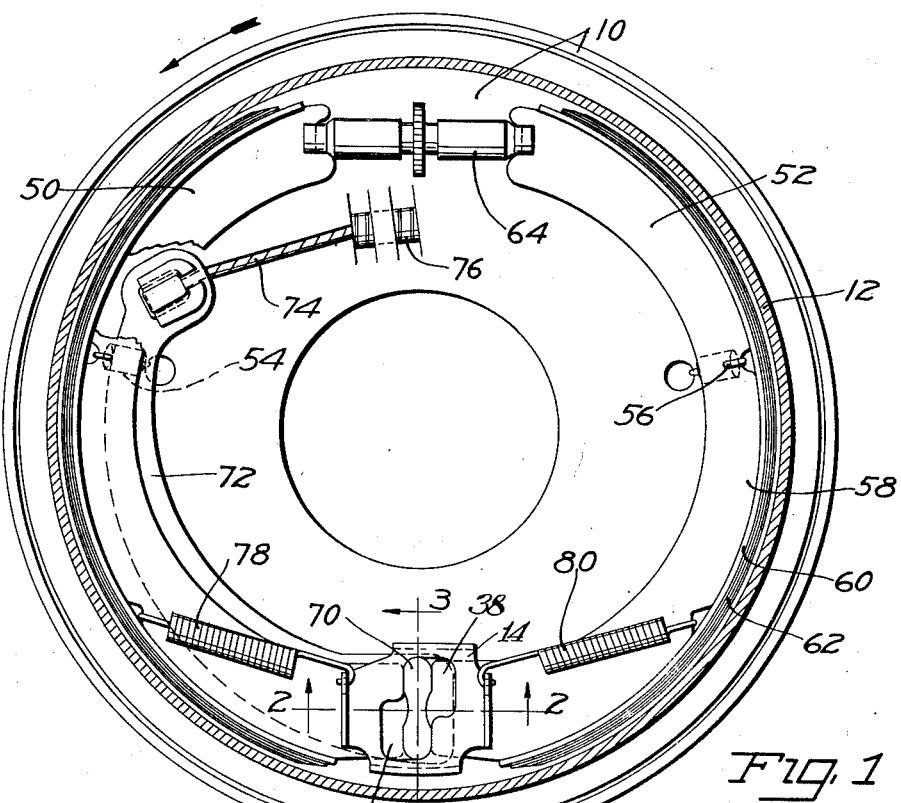
Figure 1 is a vertical sectional view of a brake taken just back of the head of the drum illustrating the friction elements in side elevation and showing the invention as applied.
Figure 2:
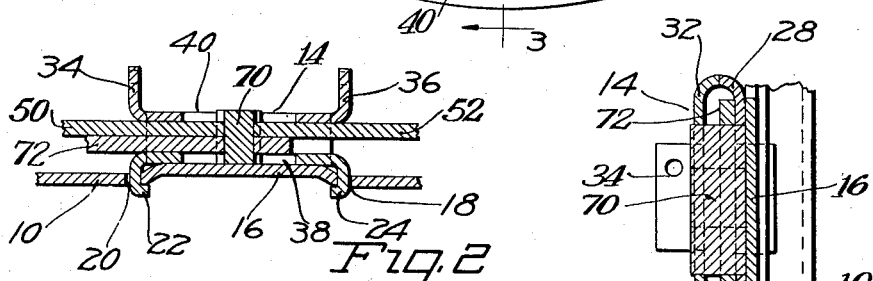
Figure 2 is a sectional view substantially on the line 2—2, Fig. 1.
Figure 3:
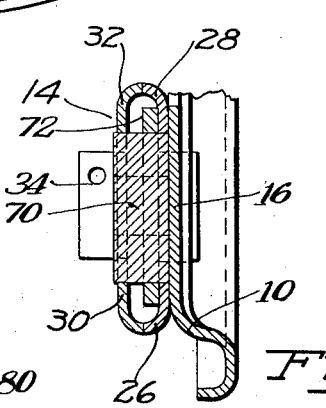
Figure 3 is a sectional view substantially on the line 3—3, Fig. 1.
Figure 4:
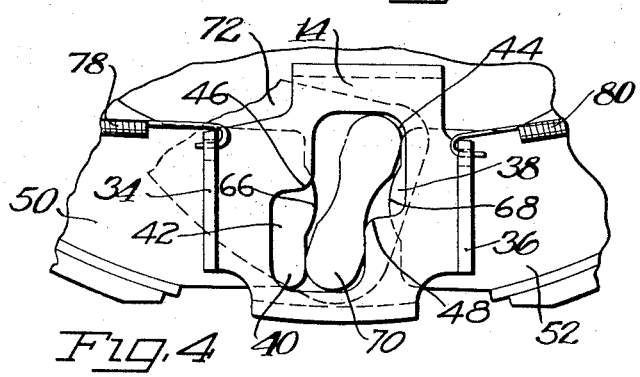
Figure 4 is an enlarged detail view of the anchor and operating member showing the friction element in applied position.

Referring to the drawing for more specific details of the invention, 10 represents a fixed support such as a backing plate. The backing plate has associated therewith a rotatable drum 12. Positioned on the backing plate 10 is a fixed anchor 14. As shown, the backing plate has a raised portion 16 and parallel slots 18 and 20 flanking the raised portion. The anchor 14 includes a stamping having flanges 22 and 24 which are bent to extend through the parallel slots 18 and 20 and are turned to secure the stamping upon the raised portion 16 of the backing plate.

This stamping is further provided with upwardly turned flanges 26 and 28. A similar stamping is provided with downwardly turned flanges 30 and 32 which are butt-welded to the flanges 26 and 28. This stamping is also provided with upwardly turned flanges 34 and 36 to which may be attached return springs to be hereinafter described.

The respective stampings comprising the anchor have registering openings 38 and 40. The particular contours of these openings constitute a relatively important feature of the invention; since they provide an anchor for the friction element, and so confine the operating member to produce substantially the same leverage in both directions of drum rotation.

As shown, the openings 38 and 40 have offset portions 42 and 44 arranged in reverse directions, so as to provide shoulders 46 and 48 adaptable for engagement with the operating member according to the direction of drum rotation.

Positioned for movement on the backing plate are interchangeable brake shoes 50 and 52 supported by springs 54 and 56. Each of the shoes include a web 58 supporting a rim 60 to which is suitably secured a lining 62 adaptable for cooperation with the braking surface of the drum. The shoes are connected at their articulated ends by an adjusting member 64 and the separable ends of the shoes are provided with shoulders 66 and 68 of substantially the same profile as the respective sides of a floating operating cam 70, positioned in the openings 38 and 40 and suitably secured to an operating lever 72 having in its end an opening into which cam 70 is pressed and which is connected to a drag cable 74 extending through the backing plate as indicated at 76 and leading to an operating means, not shown.

The shoes 50 and 52 are connected by suitable return springs 78 and 80 to the flanges 34 and 36 on the anchor. These springs serve to return the shoes to the off position and to retain the shoes when in this position in proper spaced relation to the drum.

Assuming that the drum is rotating, as indicated by the arrow in Figure 1, upon initial movement of the operating lever 72 the shoes are spread into drum engagement by the cam 70. Upon engaging the drum the shoes are given a slight centrifugal movement causing the shoulders 66 on the shoe 50 to anchor against the operating cam 70 which in turn anchors on the shoulder 48. In reverse movement the shoe 52 is caused to anchor on the operating cam which in turn anchors on the shoulder 46; hence the same leverage is obtained in both forward and reverse braking.

The arrangement of the anchor and the operating member and their relation to each other, is such that the friction element anchors through the operating member, on either the shoulder 46 or 48 on the anchor according to the direction of drum rotation. Since the operating member is arranged to roll within certain restricted limits and is not positioned on a pivot, there is no friction in the operation of the cam.

It is also to be observed that the reaction force is applied between spaced points and therefore there is no twisting moment in the operation of the cam.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent, is:

1. A brake comprising an operating member including a stamping having an opening in one end thereof, a member pressed into the opening and lobes on the member on each side of the operating member.

2. A brake comprising an operating member including a stamping having an opening in one end thereof, a member having a portion fitting snugly in the opening, and portions extending from each side of the stamping including oppositely arranged lobes.

3. A brake comprising an anchor including corresponding flanged stampings, the adjacent flanges being butt-welded one to another.

4. A brake comprising a backing plate, and an anchor including stampings having flanges secured to the backing plate.

5. A brake comprising a backing plate having parallel slots, an anchor on the backing plate having flanges extending through the slots and deformed to secure the anchor against displacement.

6. A brake comprising a backing plate having a raised portion and parallel slots flanking the raised portion, an anchor positioned on the raised portion having flanges extending through the slot and deformed against the backing plate.

7. A brake comprising an anchor including corresponding stampings provided with oppositely turned flanges with the adjacent flanges being secured together.

8. A brake comprising an anchor including corresponding stampings having oppositely turned flanges the adjacent flanges being secured together, and registering openings in the stampings.

9. A brake comprising an anchor having spaced parts provided with registering openings, an operating lever positioned between the parts, and a cam secured on the operating member having portions extending into the openings.

10. A brake comprising an anchor having spaced parts provided with registering openings, a floating operating lever between the parts, and a cam carried by the operating lever having portions extending into the openings.

11. A brake comprising an anchor having spaced parts provided with registering openings, shoulders on the parts extending into the openings, a floating operating lever positioned between said parts, and a cam on the lever arranged for engagement with the shoulders.

12. A brake comprising an anchor having spaced parts provided with registering openings, shoulders on each of the parts extending into the openings, a floating operating lever positioned between the parts, a cam carried by the lever having portions extending into the respective openings and adaptable for engagement with the shoulders on the stampings.

13. A brake comprising a backing plate, an anchor positioned on the backing plate having spaced parts provided with registering openings, shoulders arranged on the respective parts extending into the openings in opposite directions, a floating operating member positioned between the respective parts, a cam on the operating member extending into the respective openings for engagement with the shoulders, and a friction element having separable ends positioned between the parts of the anchor in engagement with the cam.

14. A brake comprising a fixed support, a rotatable drum associated therewith, an anchor on the support having spaced parts provided with registering openings, shoulders on the respective parts extending into the openings in opposite directions, a floating operating member positioned between the spaced parts having portions extending into the openings adaptable for engagement with the shoulders, a friction element on the support adaptable for cooperation with the drum having separable ends extending between the spaced parts of the anchor and in direct thrust engagement with the cam.

15. A brake comprising a fixed support, a rotatable drum associated therewith, an anchor on the support having spaced parts provided with registering openings, shoulders on the parts extending into the openings, a floating operating member, a cam on the operating member extending into the openings and adapted to engage the shoulders on the spaced parts, a friction element positioned for movement on the backing plate and adaptable for cooperation with the drum and having separable ends positioned between the parts in direct thrust engagement with the cam.

16. A brake comprising an anchor, a floating operating member positioned within the anchor and having an operating lever extending around the brake inside the brake, a flexible tension connection extending inside the brake and connected to said lever, and shoes engaging the operating member.

17. A brake comprising an anchor, a floating operating member within the anchor, shoes engaging the operating member and anchoring through the operating member.

18. A brake comprising an anchor, a floating operating member within the anchor, shoes engaging the operating member and anchoring through the operating member supported on both sides of the shoes.

WILLIAM J. ANDRES.